United States Patent [19]

Marianowski et al.

[11] Patent Number: 5,342,706
[45] Date of Patent: * Aug. 30, 1994

[54] FULLY INTERNAL MANIFOLDED FUEL CELL STACK

[75] Inventors: Leonard G. Marianowski, Mount Prospect; Randy J. Petri, Crete, both of Ill.

[73] Assignee: Institute of Gas Technology, Chicago, Ill.

[ * ] Notice: The portion of the term of this patent subsequent to Oct. 16, 2007 has been disclaimed.

[21] Appl. No.: 90,427

[22] Filed: Jul. 12, 1993

Related U.S. Application Data

[63] Continuation-in-part of Ser. No. 724,422, Jul. 2, 1991, Pat. No. 5,227,256, which is a continuation-in-part of Ser. No. 505,293, Apr. 10, 1990, Pat. No. 5,045,413, and a continuation-in-part of Ser. No. 517,227, May 1, 1990, Pat. No. 5,077,148, said Ser. No. 505,293, and Ser. No. 517,227, is a continuation-in-part of Ser. No. 346,666, May 3, 1989, Pat. No. 4,963,442.

[51] Int. Cl.$^5$ .......................... H01M 8/10; H01M 8/14
[52] U.S. Cl. ........................ 429/35; 429/39; 429/46
[58] Field of Search ................. 429/16, 13, 34, 35, 429/38, 39, 17, 33, 30, 46

[56] References Cited

U.S. PATENT DOCUMENTS

| | | |
|---|---|---|
| 3,012,086 | 12/1961 | Vahldieck . |
| 3,266,938 | 8/1966 | Parker et al. . |
| 3,488,226 | 1/1970 | Baker et al. . |
| 3,514,333 | 5/1970 | Novack . |
| 3,589,941 | 6/1971 | Eaton et al. . |
| 3,723,186 | 3/1973 | Borucka et al. . |
| 3,867,206 | 2/1975 | Trocciola et al. . |
| 4,160,067 | 7/1979 | Camara et al. . |
| 4,259,389 | 3/1981 | Vine et al. . |
| 4,329,403 | 5/1982 | Baker . |
| 4,510,213 | 4/1985 | Schnacke . |
| 4,522,894 | 6/1985 | Hwang et al. . |

(List continued on next page.)

FOREIGN PATENT DOCUMENTS

| | | |
|---|---|---|
| 0384944 | 9/1990 | European Pat. Off. . |
| 62-98567 | 5/1987 | Japan . |
| 1239773 | 9/1989 | Japan . |
| 1239774 | 9/1989 | Japan . |

OTHER PUBLICATIONS

"Modern Designs for Effective Heat Transfer," American Heat Reclaiming Corp., 1270 Avenue of the Americas, New York, N.Y. 10020. (No date shown).

(List continued on next page.)

Primary Examiner—Anthony Skapars
Attorney, Agent, or Firm—Speckman, Pauley & Fejer

[57] ABSTRACT

A fully internally manifolded fuel cell stack is provided by each separator plate and electrolyte in the fuel cell stack having a plurality of aligned perforations forming gas manifolds extending for the length of the cell stack. Each perforation through the separator plate is surrounded by a flattened manifold wet seal structure extending to contact the electrolytes on each face of the separator plate to form separator plate/electrolyte wet seals under cell operating conditions. Conduits through the extended manifold wet seal structure provides gas communication between one set of manifolds and the anode chambers on one face of the separator plates, and conduits through the extended manifold wet seal structure on the opposite face of the separator plates provides gas communication between a second set of the manifolds and the cathode chambers on the other face of the separator plates. Extended wet seal structures formed of thin plate material provide limited flexibility and resiliency to assure good sealing. This structure provides fully internal manifolding of and separation of fuel and oxidant gases to each of the unit fuel cells in the fuel cell stack. The disclosed structure is suitable for both high temperature cell stacks, such as molten carbonate cell stacks, and low temperature cell stacks, such as ion exchange membrane cell stacks.

35 Claims, 2 Drawing Sheets

U.S. PATENT DOCUMENTS

| | | |
|---|---|---|
| 4,579,788 | 4/1986 | Marianowski et al. . |
| 4,702,973 | 10/1987 | Marianowski . |
| 4,708,916 | 11/1987 | Ogawa et al. . |
| 4,761,348 | 8/1988 | Kunz et al. . |
| 4,769,298 | 9/1988 | Hosaka . |
| 4,781,727 | 11/1988 | Mitsuda et al. . |
| 4,786,568 | 11/1988 | Elmore et al. . |
| 4,824,739 | 4/1989 | Breault et al. . |
| 4,963,442 | 10/1990 | Marianowski et al. . |
| 5,045,413 | 9/1991 | Marianowski et al. . |
| 5,077,148 | 12/1991 | Schora et al. . |

OTHER PUBLICATIONS

"Superchanger Plate and Frame Heat Exchanger," Tranter, Inc., Wichita Falls, Tex. 76307. (No date shown).

Patent Abstracts of Japan, vol. 12, No. 273 (E-639) [3120] Jul. 29, 1988.

Patent Abstracts of Japan, vol. 12, No. 130 (E-603) [2977] Apr. 21, 1988.

Patent Abstracts of Japan, vol. 13, No. 288 (E-781) [3636] Jun. 30, 1989.

Patent Abstracts of Japan, vol. 13, No. 46 (E-711) [3394] Feb. 2, 1989.

Patent Abstracts of Japan, vol. 13, No. 325 (E-792) [3673] Jul. 21, 1989.

Patent Abstracts of Japan, vol. 13, No. 88 (E-721) [3436] Feb. 28, 1989.

Patent Abstracts of Japan, vol. 13, No. 312 (E-788) [3660] Jul. 17, 1989.

Patent Abstracts of Japan, vol. 9, No. 318 (E-366) [2041] Dec. 13, 1985.

Patent Abstracts of Japan, vol. 13, No. 364 (E-805) [3712] Aug. 14, 1989.

Patent Abstracts of Japan, vol. 13, No. 518 (E-848) [3866] Nov. 20, 1989.

Michael Tarjanyi, Lawrence Paetsch, Randolph Bernard, Hossein Ghezel-Ayagh, "Development of Internal Reforming Catalysts for the Direct Fuel Cell," pp. 177–181, 1985 Fuel Cell Seminar, Tucson, Ariz., May 19–22, 1985.

FULLY INTERNAL MANIFOLDED FUEL CELL STACK

CROSS REFERENCE TO RELATED APPLICATIONS

This application is a continuation-in-part of U.S. patent application Ser. No. 07/724,422, filed Jul. 2, 1991, entitled Fully Internal Manifolded Fuel Cell Stack, now U.S. Pat. No. 5,227,256 which is a continuation-in-part of U.S. patent application Ser. No. 07/505,293, filed Apr. 10, 1990, entitled Fully Internal Manifolded Fuel Cell Stack, now U.S. Pat. No. 5,045,413, and U.S. patent application Ser. No. 07/517,227, entitled Fully Internal Manifolded and Internal Reformed Fuel Cell Stack, now U.S. Pat. No. 5,077,148, each of said latter two applications being a continuation-in-part of U.S. patent application Ser. No. 07/346,666, filed May 3, 1989, entitled Internal Manifolded Molten Carbonate Fuel Cell Stack, now U.S. Pat. No. 4,963,442.

BACKGROUND OF THE INVENTION

1. Field of the Invention

This invention relates to internally manifolded fuel cell stacks, and in particular, sub-assemblies of an anode/current collector/separator plate/current collector/cathode, therefore, which upon assembly with electrolyte have wet seals between only the electrolyte and electrodes to provide ease of assembly and long term stability. This invention further relates to internally manifolded fuel cell stacks in which the electrolyte is an organic polymer.

Generally, fuel cell electrical output units are comprised of a stacked multiplicity of individual cells separated by inert or hi-polar electronically conductive separator plates. Individual cells are sandwiched together and secured into a single staged unit to achieve desired fuel cell energy output. Each individual cell generally includes an anode and cathode electrode, a common electrolyte, and a fuel and oxidant gas source. Both fuel and oxidant gases are introduced through manifolds to their respective reactant chambers between the separator plate and the electrolyte. The area of contact between the electrolyte and other cell components to maintain separation of the fuel and oxidant gases and prevent and/or minimize gas leakage is known as the wet seal. A major factor attributing to premature high temperature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Such failures permit undesired fuel and/or oxidant gas crossover and overboard gas leakage which interrupts the intended oxidation and reduction reactions thereby causing breakdown and eventual stoppage of cell current generation.

This invention provides fully internal manifolding of the fuel and oxidant gases to and from the individual cells of an assembled stack in a manner, due to the design of the cell components, which provides ease of assembly, long term endurance and stability of fuel cell operation in both high and low temperature fuel cell stacks. This invention further provides a fully internal manifolded fuel cell stack which operates at low temperatures utilizing generally non-corrosive electrolyte.

2. Description of Related Art

Commercially viable fuel cell stacks may contain up to about 600 individual cells each having a planar area on the order of three to twelve square feet. In stacking such individual cells, separator plates separate the individual cells, with fuel and oxidant each being introduced between a set of separator plates, the fuel being introduced between one face of a separator plate and the anode side of an electrolyte and oxidant being introduced between the other face of the separator plate and the cathode side of a second electrolyte.

The emphasis in fuel cell development has been in external manifolding of the fuel and oxidant gases by using channel manifolds physically separable from the fuel cell stack. However, the inlets and outlets of each cell must be open to the respective inlet and outlet manifolds which must be clamped onto the exterior of the cell stack. To prevent electrical shorting, insulation must be used between the metal manifolds and the cell stack. External manifolding has presented serious problems in maintaining adequate gas seals at the manifold/manifold gasket/cell stack interface while preventing carbonate pumping within the gasket along the potential gradient of the cell stack. Various combinations of insulating the metal manifold from the cell stack have been used, but with the difficulty of providing a sliding seal which is gas tight and electrically insulating, no satisfactory solution has been found. The problem of manifolding and sealing becomes more severe when a larger number of cells and larger planar areas are used in the cell stack. When greater number of cells are used, the electrical potential driving the electrolyte in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack.

Cell stacks containing 600 cells can be approximately 10 to 20 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual fuel cells, such as molten carbonate fuel cells, have been constructed with spacer strips around the periphery of a separator plate to form wet seals and to provide intake and exhaust manifolds. Various means of sealing in the environment of the high temperature fuel cell wet seal area of such fuel cells are disclosed in U.S. Pat. No. 4,579,788 which teaches the wet seal strips fabricated utilizing powder metallurgy techniques; U.S. Pat. No. 3,723,186 which teaches the electrolyte itself comprised of inert materials in regions around its periphery to establish an inert peripheral seal between the electrolyte and frame or housing; U.S. Pat. No. 4,160,067 which teaches deposition of inert materials onto or impregnated into the fuel cell housing or separator in wet seal areas; U.S. Pat. No. 3,867,206 which teaches a wet seal between electrolyte-saturated matrix and electrolyte saturated peripheral edge of the electrodes; U.S. Pat. No. 4,761,348 which teaches peripheral rails of gas impermeable material to provide a gas sealing function to isolate the anode and cathode from the oxidant and fuel gases, respectively;

U.S. Pat. No. 4,329,403 which teaches graded electrolyte composition for more gradual transition in the coefficient of thermal expansion in passing from the electrodes to the inner electrolyte region; and U.S. Pat. No. 3,514,333 which teaches housing of alkali metal carbonate electrolytes in high temperature fuel cells by use of a thin aluminum sealing gasket. None of the above patents deal with sealing around internal fuel and oxidant in fuel cell stacks.

Gas sealing of a phosphoric acid fuel cell, which operates at about 150° to 220° C., by filling the pores of a porous material periphery of the cell constituents with silicon carbide and/or silicon nitride is taught by U.S. Pat. No. 4,781,727; and by impregnating interstitial spaces in substrate plate edge is taught by U.S. Pat. Nos. 4,786,568 and 4,824,739. Solutions for sealing and corrosion problems encountered in low temperature electrolytic cells, such as bonding granular inert material with polytetrafluoroethylene as taught by U.S. Pat. No. 4,259,389; gaskets of polyethylene as taught by U.S. Pat. No. 3,012,086; and "0"-ring seals as taught by U.S. Pat. No. 3,589,941 for internal manifolding of fuel only are not suitable for high temperature fuel cells, such as molten carbonate fuel cells.

U.S. Pat. No. 4,510,213 teaches transition frames surrounding the active portion of the cell units to provide fuel and oxidant manifolds to the gas compartments of the individual cells, the manifolds not passing through the separators nor the electrolyte tiles of the cells. The transition frames require complicated insulating between adjacent cells and are made up of several separate and complicated components. U.S. Pat. No. 4,708,916 teaches internal manifolding of fuel and external manifolding of oxidant for molten carbonate fuel cells wherein sets of fuel manifolds pass through electrodes as well as electrolytes and separators in a central portion and at opposite ends of the individual cells to provide shortened fuel flow paths. The end fuel manifolds are in a thickened edge wall area of the separator plate while the central fuel manifolds pass through a thickened central region and sealing tape impregnated with carbonate or separate cylindrical conduit inserts are provided extending through the cathode.

Internal manifolding has been attempted wherein multiple manifold holes along opposite edges of the cell have been used to provide either co- or counter-current flow of fuel and oxidant gases. These manifold holes for fuel have been located in a broadened peripheral wet seal area along opposing edges, but the manifolds have been complicated structures exterior to the electrolyte or pass through at least one of the electrodes. However, adjacent manifold holes are used for fuel and oxidant which provide short paths across a short wet seal area and leakage of the gases as well as the necessarily broadened peripheral seal area undesirably reducing the cell active area, as shown, for example in U.S. Pat. No. 4,769,298. Likewise, prior attempts to provide internal manifolding have used multiple manifold holes along broadened peripheral wet seal areas on each of all four edges of the cell to provide cross flow, but again short paths between adjacent fuel and oxidant manifold similar complicated structures and holes caused leakage of the gases and further reduced the cell active area.

SUMMARY OF THE INVENTION

This invention provides fully internally manifolded fuel cell stacks, especially suitable for use in both high temperature molten carbonate fuel cell stacks and low temperature ion exchange, preferably proton exchange, membrane fuel cell stacks. The fully internally manifolded fuel cells of this invention are suitable for any cell having planar components, especially high temperature fuel cells such as solid conductor/solid oxide fuel cells. A generally rectangular fuel cell stack is made up of a plurality of fuel cell units, each fuel cell unit comprising an anode and a cathode, an electrolyte in contact on one side with the anode and in contact on the opposite side with the cathode, and a separator plate separating cell units between the anode of one cell and cathode of the adjacent cell forming an anode chamber between one side of the separator plate and the anode and a cathode chamber between the opposite side of the separator plate and the cathode. The fuel cell units are stacked and provided with end plates having the same internal configuration as the separator plates forming half cells at each end and clamped to provide rigid structure to the fuel cell stack. In the fuel cell stacks of this invention, the electrolytes, electrodes, current collectors, and separator plates may have about the same configuration and extend to the region of the edge of the fuel cell stack. The separator plates have a flattened or ribbed peripheral seal structure extending to contact a current collector and/or electrode on each face of the separator plates completely around their periphery to form a peripheral seal. A sub-assembly of an anode, anode current collector, separator plate, cathode current collector and cathode may be fabricated under controlled conditions and then such a sub-assembly combined with the electrolyte portion of the cell when making up the cell stack.

The electrolytes, electrodes, current collectors and separator plates have a plurality of aligned perforations in desired locations, each separator plate perforation being surrounded by a flattened or ribbed manifold seal structure extending to contact the current collector and/or electrode on each face of the separator plate to form a separator plate/current collector and/or electrode seal surrounding each perforation to form ! a gas manifold through each perforation and extending through the cell stack. Conduits or holes through the extended manifold seal structure provide gas communication between fuel manifolds and the anode chambers on one face of the separator plates and conduits or holes through the extended manifold seal structure provide gas communication between the oxidant manifolds and the cathode chambers on the other face of the separator plates. This structure provides fully internal manifolding of fuel and oxidant gases to and from each of the unit fuel cells in the fuel cell stack. In a similar manner, hydrocarbonaceous reaction gas and steam may be supplied to reforming chambers interspersed throughout the fuel cell stack and hydrogen enriched reformed product gas passed from each of the reforming chambers to a fuel manifold for supply to downstream anode compartments.

The stack end plates are configured similarly to the separator plates on their inner sides and are provided with means for supply and exhaust from each of the sets of manifolds of the fuel cell stack. External means of supplying and exhausting fuel gas and oxidant gas to the appropriate sets of manifolds at the end plate connections may be provided by any means known to the art. By "sets of manifolds" we mean a first set makes up one or more fuel inlets, a second set one or more spent fuel outlets, a third set one or more oxidant inlets, and a fourth set one or more spent oxidant outlets. The perforations through the separator plates, current collectors, electrodes and electrolytes forming the manifolds may be round, square, rectangular, triangular, or any other desired shape and size. While each such perforation is referred to as a single perforation, it may comprise baffling to provide desired gas distribution. Any number of manifolds may be provided through the separator plates and electrolytes as necessary to provide desired gas flow quantities and patterns across the active areas of the cell. It is important in this invention to provide seals directly between the separator plate and current collectors and/or electrodes around each manifold with the edge of adjacent manifolds being separated by at least about 0.25 inch. This invention also provides a continuous peripheral seal directly between the separator plate and current collectors and/or electrodes exterior to the regions of the internal manifolds.

In one preferred embodiment particularly suitable for low temperature fuel cells, the separator plates in accordance with this invention are thin pressed plates of stainless steel, graphite, or graphite/plastic composite provided with corrugations and/or dimples in the fully active fuel cell area and pressed to form on one face the full peripheral and manifold seal structures with an upstanding seal structure secured to the opposite face of the separator plate to provide full peripheral and manifold seals between the separator plate and current collector or electrode on opposite faces of the separator plates. Any structure may be used to provide the extended seal areas, such as bars, strips, and the like. Sub-assemblies of the separator plate with an anode current collector and/or anode on one side and a cathode current collector and/or cathode on the opposite side may be made by welding or brazing the metallic components together in the region of the manifold and the peripheral seal structures.

In a preferred embodiment, conduits or holes through the extended manifold seal structure providing gas communication between the manifold and the anode and cathode chambers may be openings provided by appropriately corrugated material or may be holes through metal or bar structures.

This invention provides assured sealing of one gas conduit from the adjacent gas conduit, thereby affording effective means for providing fully internally manifolded gas feed and removal from high temperature and corrosive fuel cells, such as, molten carbonate fuel cell stacks, as well as low temperature fuel cells, such as proton exchange membrane cells.

This invention provides a mass producible configuration of the fuel cell components, particularly the sub-assembly of the separator plate, anode current collector and/or anode, and cathode current collector and/or cathode and its cost effective fabrication under controlled conditions. Use of the sub-assemblies of this invention provides ease of assembly of the fuel cell stack and modularization for varying sizes of fuel cell stacks.

This invention also provides a process for production of electricity using the fully internally manifolded fuel cell stack, particularly, molten alkali metal carbonates and ion exchange fuel cell stacks.

BRIEF DESCRIPTION OF THE DRAWINGS

Further features of the invention will be apparent from the following detailed description of the invention read in conjunction with the drawings, wherein.

DESCRIPTION OF PREFERRED EMBODIMENTS

Figure 1:
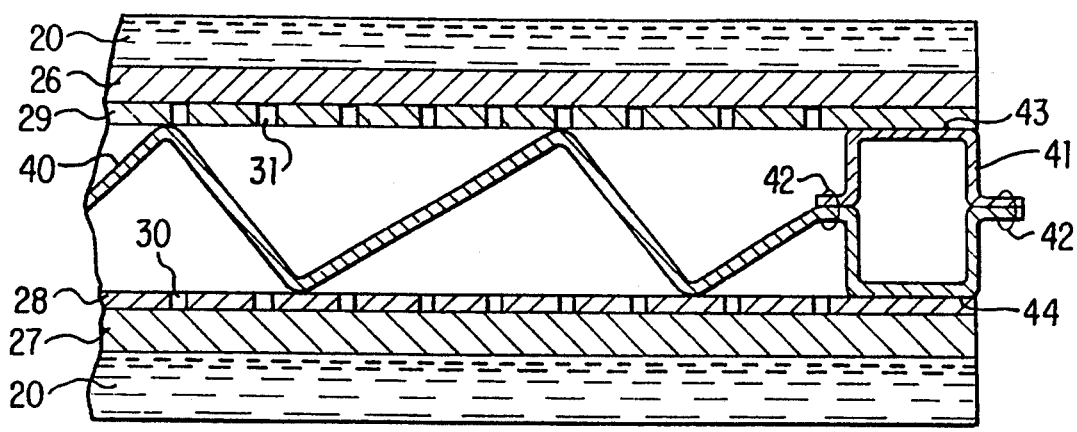
FIG. 1 is a sectional side view of a peripheral wet seal area of a fuel cell according to one embodiment of this invention.

In the preferred embodiments of this invention flow of fuel and oxidant through the fully internal manifolded fuel cell stack is the same as described in U.S. Pat. No. 5,045,413, incorporated herein in its entirety by reference. This patent describes in greater detail embodiments of the invention directed to having the electrodes and current collectors mounted in recesses provided in the separator plates with wet seals between the electrolyte and separator plate being formed by upstanding manifold wet seal structures and peripheral wet seal structures extending to contact the electrolyte providing generally fluid-tight anode and cathode chambers in communication with desired fully internal fuel, oxidant, and exhaust manifolds. The embodiments more fully described herein are directed to electrodes and current collectors extending to the peripheral region of the separator plate which enlarges acceptable manufacturing tolerances and renders sub-assembly of the electrodes, current collectors and separator plate a more practical alternative. In the embodiments more fully described herein, the wet seals are between the electrolyte and the electrodes in the seal areas surrounding each of the internal manifolds and the peripheral seal area.

This invention is directed toward fully internally manifolded fuel cell stacks. In preferred embodiments, the electrolyte, electrodes, current collectors, and separator plates are each penetrated by aligned manifold conduits. Each of these components is about the same overall size, the electrodes and current collectors extending to or near the cell periphery. This invention overcomes problems of very close tolerances required to fit tightly within recesses of separator plates. This invention also simplifies and makes practical assembly of anode/current collector/separator plate/current collector/cathode assembled units. Preassembly of such assembled units greatly facilitates assembly of fuel cell stacks by greatly reducing the number of stack components. This invention preferably utilizes thin sheet separator plates having pressed seal areas extending from one face of the separator plate and thin sheet forms extending from the opposite face of the separator plate to form seal areas. The thin sheet seal areas afford limited flexibility and resilience to provide tight sealing.

A fuel cell stack according to this invention provides flow of fuel and oxidant gases fully internal to the cell stack, as more fully described in the above identified U.S. patent and incorporated herein by reference. Manifold holes may be provided in the corner areas af the electrolyte which extends to the edge of the cell together with the cell separator plates, as shown in the prior applications. By contact between the electrolyte and the separator plate on each face forming conventional wet seals on each face around the periphery of the electrolyte, the containment of the fluids is maintained. Through desired openings providing fluid communication between manifold holes and anode and cathode compartments, the desired gaseous flow may be obtained while providing sealing of the manifold holes with conventional electrolyte/separator plate wet seals. The embodiments more fully explained in this application have electrodes and current collectors extending to the peripheral region of the separator plates and thus require matching manifold holes in the electrodes and current collectors and provide wet seals between the electrolyte and electrode, rather than between the electrolyte and the separator plate as in the prior described embodiments.

The matching manifold holes in the separator plates, electrolyte tiles, electrodes and current collectors form manifold conduits which are continuous for the entire height of the fuel cell stack for gas supply and exhaust. This invention provides that a manifold conduit extending to all cells in a fuel cell stack is supplied from a single external opening, whereas prior externally manifolded fuel cell stacks have required external openings to and from each individual fuel cell. The gases are fed to the fuel cell stack through an end plate which acts as one half cell and are exhausted through a similar end plate which acts as another half cell.

The manner in which fluids are fed to and withdrawn from fuel cell stacks can take on a wide variety of variations. Gas sealing is accomplished by sealing between the electrolyte tiles and the electrodes in the conventional wet seal manner both around the periphery of the separator plate and in the gas manifold area as desired for conducting the gas to desired locations within each individual cell in the fuel cell stack. The wet seals are formed in these areas due to the corresponding upstanding seal structures on both sides of the separator plate.

As shown in FIG. 1 of each of the prior related applications, electrolyte 20 and separator plate 40 extend to the outer edge of the cell and are sealed to each other around their periphery in wet seal areas 23. An individual molten carbonate fuel cell unit is shown with anode 26 spaced from one face of separator plate 40 to provide an anode chamber fed by fuel manifold hole 24 as indicated by arrow 38. On the other face of separator plate 40, cathode 27 is spaced from separator plate 40 to form a cathode chamber in communication with oxidant manifold holes 25 as indicated by arrow 39. Electrolyte 20 and separator plate 40 extend to the outer edge of the cell forming peripheral wet seal areas 23 which provide peripheral wet seals between the electrolyte and separator plate for containment of fluid. Fuel manifold wet seal area 45 and oxidant wet seal area 46 provide manifold sealing by electrolyte/separator plate wet seals and provide desired guidance of fluid to anode and cathode chambers on opposite sides of separator plate 40. No additional gaskets are used for sealing.

FIG. 1 of this disclosure, not drawn to scale, shows in more detail a peripheral seal area in accordance with one embodiment of this invention wherein thin sheet separator plate 40 is corrugated with the peaks on one face of the corrugations adjacent cathode current collector 28 with perforations 30 and formed to have flat thin sheet separator plate seal area 44 which lies adjacent cathode current collector 28 on the cathode face of the cell. Separator plate seal strip 41 formed from thin strip material is welded by welds 42, or otherwise attached, to the anode face of separator plate 40 to provide flat separator plate seal strip seal area 43 which lies adjacent anode current collector 29 with perforations 31 on the anode side of the cell. It is readily apparent that the position of the separator plate and the seal strip may be reversed and that spacing of separator seal strip seal area 43 and separator seal area 44 may be formed to fit the spacing requirements of individual cells. Again, no additional gaskets are used for sealing.

When carbonate tapes are used, the carbonate tapes and electrolyte matrix extend to the cell edges and although the inter-cell spacing decreases in proportion to the thickness of the carbonate tapes when they melt, sealing and conformity of all cell components is maintained at all times. During cell heat-up prior to carbonate tape melting, sealing is maintained around each manifold hole 24 and 25 because the carbonate tapes and the electrolyte matrix, such as $LiAlO_2$, extend adjacent to the respective sealing surfaces and contain a rubbery binder. During binder burnout, which occurs prior to carbonate melt, gas flows are maintained and sealing is obtained. When the binder is burned off and the cell temperature raised to the melting point of the carbonate, the melting carbonate is absorbed by the porous $LiAlO_2$ tape and the electrodes. The inter-cell spacing decreases as the carbonate tapes melt, but at all stages from room temperature to operating temperatures of about 650° C., cell sealing is maintained. The limited flexibility and resiliency of the thin sheet metal in the seal areas aids in assuring maintenance of cell sealing.

A low temperature fuel cell in accordance with one embodiment of this invention, operating at a temperature in the range of about 80° C. to about 110° C. is similarly constructed. The primary differences between such low temperature fuel cells and the high temperature fuel cells described hereinabove are the materials used for the electrolytes and separator plates. In accordance with this embodiment of this invention, separator plate 40, which must be made of an electronically conducting material, comprises pressed sheets of stainless steel, graphite or a graphite/plastic composite having a thickness preferably between about 0.005 to about 0.020 inches. Electrolytes for low temperature fuel cells in accordance with this embodiment are ion exchange membranes, preferably proton exchange membranes. Suitable materials for such membranes are organic polymers such as perfluorosulfonic acid having a thickness of about 0.0005 to about 0.010 inches.

Figure 2:
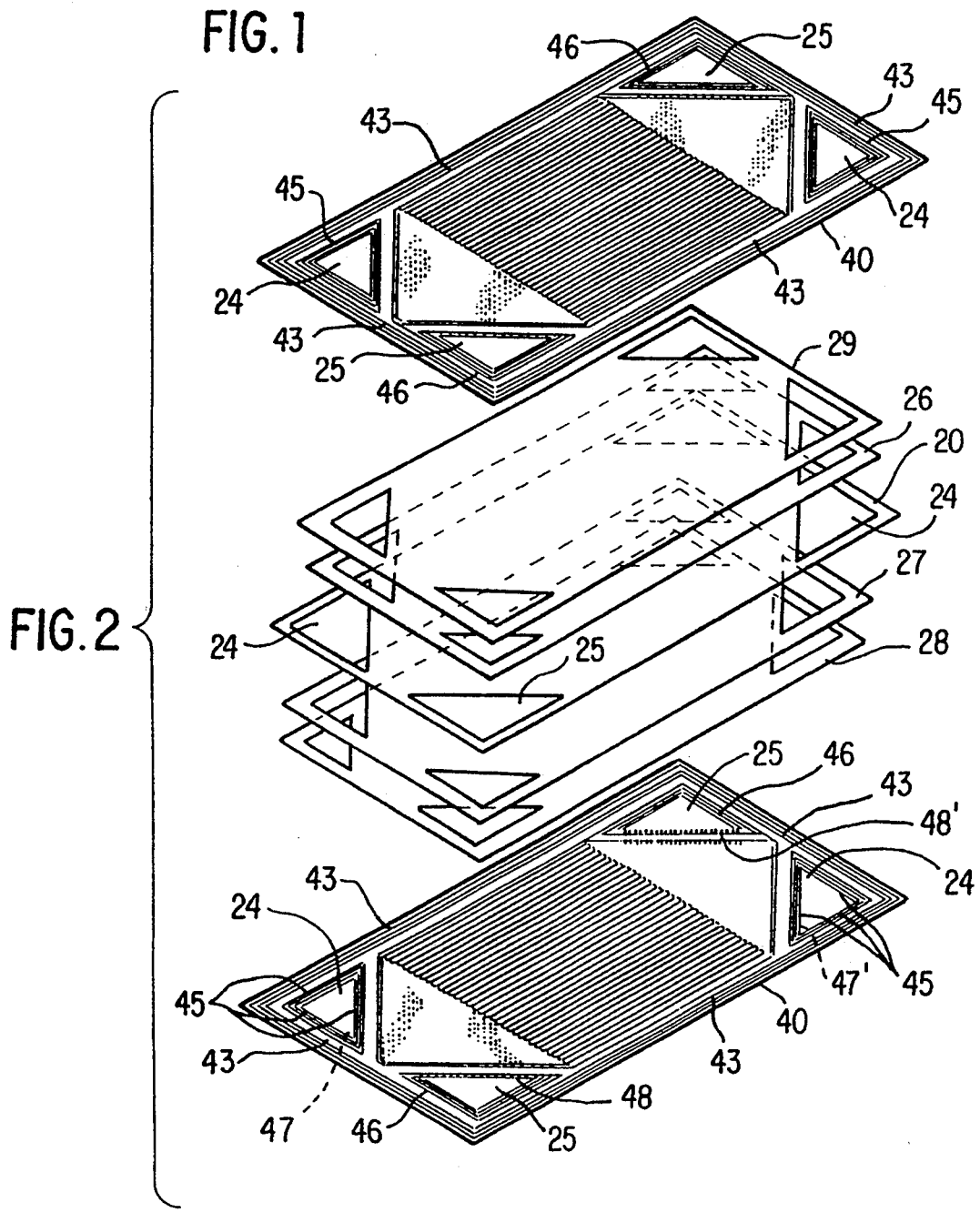
FIG. 2 is an exploded perspective view of a single cell unit of a fuel cell stack in accordance with one embodiment of this invention.

FIG. 2 is a perspective exploded view of a fuel cell unit of a molten carbonate fuel cell stack according to one embodiment of this invention with separator plates 40, cathode 27, cathode current collector 28, electrolyte 20, anode 26 and anode current collector 29. Separator plates 40, electrodes 26 and 27, current collectors 28 and 29, and electrolyte 20 extend to the edge region of the cell and form wet seals on both faces of separator plates 40 around its entire periphery in peripheral wet seal areas 43. Peripheral wet seal areas 43 are extended both upwardly and downwardly from the general plane of separator plate 40 to provide contact with the periphery of current collectors and/or electrodes on both faces of separator plate 40. Separator plates 40, electrodes 26 and 27, and current collectors 28 and 29, and electrolyte 20 are each penetrated by corresponding fuel manifold holes 24, one for supply and one for removal, and oxidant manifold holes 25, one for supply and one for removal. While the manifold holes shown in FIG. 2 are a preferred triangular shape providing easily formed straight thin sheet manifold wet seal areas, the manifold holes may be round, rectangular or any other desired shape. The manifold holes shown in FIG. 2 are single openings, but partitions may be used in the single openings as desired to direct gas flow across the cell reactant chambers. Fuel manifold wet seal areas 45 and oxidant manifold wet seal areas 46 are extended both upwardly and downwardly from the general plane of separator plate 40 to provide contact with the current collector and/or electrode on both faces of separator plate 40 to form wet seals with the adjacent current collector and/or electrode defining the gas conduits. It is desired that the upstanding wet seal areas, of which we have found it desirable to restrict the width to less than about 1 inch, be constructed of the same thin material as the separator plate using plate thicknesses described above in order to avoid sagging and yielding which leads to leaking. Preferably, the width of the upstanding wet seal structures is about 0.25 to about 0.75 inch to avoid the necessity of internal bridging and supports. Further, we have found that, for molten carbonate fuel cells, wet seals of up to about 1 inch wide provide required complete removal of organic binders from green electrolyte matrix tapes during cell heat-up to allow good carbonate electrolyte retention in the electrolyte matrix. Wet seals wider than about 1 inch show indications of residual carbonaceous material and lesser amounts of carbonate electrolyte which could lead to leaky wet seals during cell operations.

As best seen in FIG. 2, oxidant manifold holes 25 are sealed by oxidant manifold wet seals 46 providing oxidant flow only to and from the cathode chamber (adjacent the upper face of the separator plate as shown) by oxidant supply openings 48 and oxidant exhaust openings 48' and preventing gas flow to or from the anode chamber while fuel manifold holes 24 are sealed by fuel manifold wet seals 45 providing fuel flow only to and from the anode chamber (adjacent the lower face of the separator plate as shown) by fuel supply openings 47 and fuel exhaust openings 47' and preventing gas flow to or from the cathode chamber. While the manifold wet seals are shown as straight pressed structures, they can be any desired shape or structure to prevent gas flow. The manifold wet seals form a double wet seal between fuel manifold hole 24 and oxidant manifold hole 25.

Separator plates 40 may be comprised of suitable materials providing desired physical strength and gas separation. The separator plates are desirably very thin, about 0.005 to about 0.050 inches thick, preferably about 0.012 to about 0.025 inches thick for high temperature fuel cell stacks and about 0.005 to about 0.020 inches thick for low temperature fuel cell stacks such as proton exchange membrane fuel cell stacks. In many high temperature fuel cell stacks, it is preferred to use bimetallic separator plates in which stainless steel may be used on the cathode face and nickel or copper on the anode face to avoid ferrous metal corrosion. The nickel or copper may be a cladding, lamination or plating about 10 percent the thickness of the separator plate. Separator plates may also be fabricated from ferrous alloys, such as type 300 series stainless steel alloys. In low temperature cell stacks such as proton exchange membrane cell stacks, the separator plates may be fabricated of stainless steel, graphite or a graphite/plastic composite.

The separator plates provide the dual function of providing a gas chamber non-reactive separator as well as providing structural strength to the fuel cell as an internal load bearing member. While it is preferred to use separator plates having a corrugated and/or dimpled cross-sectional shape in the active area to provide both strength and better gas circulation adjacent the electrodes, the principles of this invention are also applicable to flat separator plates structured to provide peripheral seal areas and to provide seals around internal manifold holes while allowing gas to pass to and from the internal manifolds as required for fuel cell operation.

Thin stamped stainless steel plates have been used in heat exchange technology as exemplified by the publications "Modern Designs For Effective Heat Transfer," American Heat Reclaiming Corp., 1270 Avenue of the Americas, New York, New York 10020 and "Superchanger Plate and Frame Heat Exchanger," Tranter, Inc. Wichita Falls, Texas 76307. These heat exchangers use a series of gasketed embossed or pressed metal plates bolted together between end frames to provide channels for passage of hot medium on one side of the plate and passage of cold medium on the other side of the plate. However, fuel cell stack separator plates present very different problems of sealing and corrosion particularly under molten alkali metal carbonates fuel cell operating conditions and different manifold configuration, sealing, and fluid communication means because two fluids must pass in separated relation between adjacent separator plates. In heat exchange, only one fluid passes between adjacent heat exchange plates. However, the technology of fluid flow over the electrodes of the fuel cell stack of this invention may advantageously utilize design techniques and patterns of plate heat exchangers, such as herringbone, washboard, straight corrugations and mixed corrugations.

Figure 3:
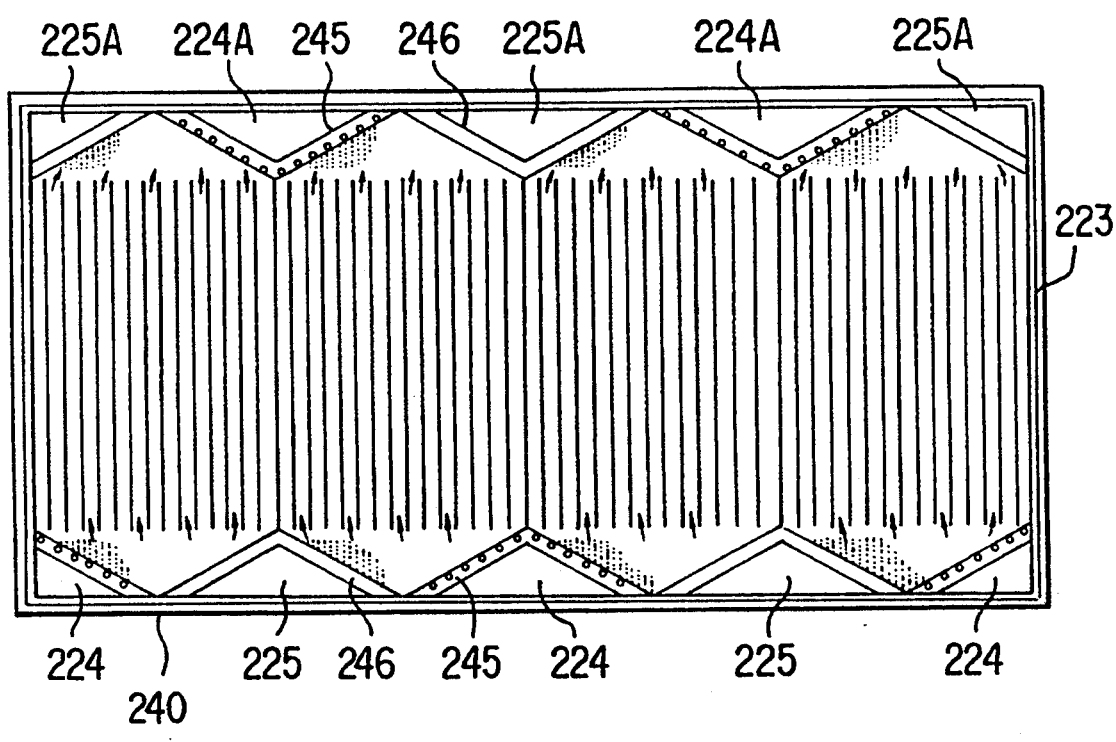
FIG. 3 is a front face view of another embodiment of a manifold plate for a fully manifolded fuel cell stack according to this invention.

In addition to embodiments of separator plates according to this invention as shown and described in greater detail in our above identified U.S. patent with respect to co-linear and counter-linear flow on opposite sides of the separator plate, FIG. 3 shows another embodiment of a separator plate useful in this invention. The separator plate shown in FIG. 3 has four similar repeating areas to provide desired gas flow when fabricating commercially feasible large area cells, in the order of 10,000 or $cm^2$ about 34 by 57 inches. FIG. 3 shows separator plate 240 with fuel supply manifolds 224 providing fuel as indicated by the arrows which passes across the active area of the cell through the anode chamber to fuel exhaust manifold holes 224A. Oxidant is supplied to the opposite side of separator plate 240 through oxidant supply holes 225 and passes through the cathode chamber to oxidant exhaust manifold holes 225A. Each of the fuel manifold holes is sealed by a wet seal 245 and each of the oxidant manifold holes is sealed by a wet seal 246 between the electrolyte and the corresponding anode or cathode and/or its current collector to prevent fluid leakage. Likewise, the entire periphery of the cell is sealed by a wet seal 223 between the electrolyte and the corresponding anode or cathode and/or its current collector. FIG. 3 shows one current collector configuration suitable for large scale fuel cell stacks according to this invention, but it will be apparent that a number of other configurations are also suitable.

We have found that by using thin sheet material in all wet seal areas of the separator plate, due to the limited flexibility and resiliency in the wet seal area upon assembly of the fuel cell stack, minimization or prevention of gas leakage can be achieved across wet seals at least 0.25 inches wide separating adjacent fuel and oxidant manifolds. The thin sheet metal separator plates according to this invention show good mechanical strength and provide ease of fabrication. An important feature of this invention is the flattened thin upstanding wet seal areas of the separator plate providing contact directly with the electrolyte of one cell on one face and the adjacent cell on the opposite face, the fuel and oxidant conduits passing through only the separator plates and the electrolytes in the fuel cell stack.

By use of separator plate/electrolyte wet seals, communication between the fuel manifold and only the anode face of the separator plate and between the oxidant manifold and only the opposite cathode face of the separator plate can be achieved without porous gaskets as are essential when external manifolding is used. Further, each gas manifold seal area may be aluminized to reduce corrosive and other wicking processes.

While in the foregoing specification this invention has been described in relation to certain preferred embodiments thereof, and many details have been set forth for purposes of illustration, it will be apparent to those skilled in the art that the invention is susceptible to additional embodiments.

We claim:

1. In a fuel cell stack comprising a plurality of fuel cell units, each said fuel cell unit comprising an anode and a cathode, an electrolyte in contact on one side with the electrolyte facing face of said anode and in contact on the opposite side with the electrolyte facing face of said cathode, and a separator plate separating said cell units between an anode and cathode forming an anode chamber between the anode facing face of said separator plate and said anode and forming a cathode chamber between the opposite cathode facing face of said separator plate and the separator facing face of the cathode of an adjacent said fuel cell unit, said anode chamber in gas communication with a fuel gas supply and outlet and said cathode chamber in gas communication with an oxidant gas supply and outlet the improvement comprising:

said electrolytes comprising an ion exchange membrane;

said electrolytes and said separator plates extending to the peripheral edge of said fuel cell stack;

said separator plates having a flattened peripheral wet seal structure extending to contact less than about 1 inch width of said electrolytes on each face of said separator plates completely around their periphery, forming a peripheral wet seal less than about 1 inch width under cell operating conditions;

said electrolytes and said separator plates each having a plurality of aligned perforations, said perforations in said separator plates being surrounded by a flattened manifold wet seal structure extending to contact less than about 1 inch width of said electrolyte on each face of said separator plate, forming a manifold wet seal less than about 1 inch width under cell operating conditions to form a plurality of gas manifolds extending through said cell stack; and conduits through said extended manifold wet seal structure providing fuel gas communication between one set of said manifolds and said anode chambers on one face of said separator plates and conduits through said extended manifold wet seal structure providing oxidant gas communication between a second set of said manifolds and said cathode chambers on the other face of said separator plates, thereby providing fully internal manifolding of fuel and oxidant gases to and from each said unit fuel cell in said fuel cell stack.

2. In a fuel cell stack according to claim 1 wherein cell stack end plates are configured the same as said separator plates on their inner faces and form half cells on each end of said fuel cell stack.

3. In a fuel cell stack according to claim 1, wherein said separator plates comprise an electronically conducting material and are about 0.005 to about 0.050 inches thick.

4. In a fuel cell stack according to claim 3, wherein said electronically conducting material is selected from the group consisting of stainless steel, graphite and a graphite/plastic composite.

5. In a fuel cell stack according to claim 4, wherein said flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates.

6. In a fuel cell stack according to claim 5, wherein said extended manifold wet seal structure on one face of said separator plates comprises a pressed shaping of said separator plates to form said extended manifold wet seal on said one face of said separator plates and on the other face of said separator plates comprises a pressed shape forming said extended manifold wet seal fastened to said other face of said separator plates.

7. In a fuel cell stack according to claim 1, wherein said flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates.

8. In a fuel cell stack according to claim 1, wherein said extended manifold wet seal structure on one face of said separator plates comprises a pressed shaping of said separator plates to form said extended manifold wet seal on said one face of said separator plates and on the other face of said separator plates comprises a pressed shape forming said extended manifold wet seal fastened to said other face of said separator plates.

9. In a fuel cell stack according to claim 1, wherein the width of said wet seals is about 0.25 to about 0.75 inches.

10. In a fuel cell stack according to claim 1, wherein said electrolytes comprise an organic polymer.

11. In a fuel cell stack according to claim 10, wherein said electrolytes comprise perfluorosulfonic acid.

12. In a fuel cell stack according to claim 1, wherein said ion exchange membrane is a proton exchange membrane.

13. In a fuel cell stack according to claim 12, wherein said electrolytes comprise an organic polymer.

14. In a fuel cell stack according to claim 13, wherein said electrolytes comprise perfluorosulfonic acid.

15. In a fuel cell stack according to claim 14, wherein said flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates and said extended manifold wet seal structure on one face of said separator plates comprises a pressed shaping of said separator plates to form said extended manifold wet seal on said one face of said separator plates and on the other face of said separator plates comprises a pressed shape forming said extended manifold wet seal fastened to said other face of said separator plates.

16. In a fuel cell stack according to claim 1, wherein a current collector is between at least one of said anode and said cathode and said separator plate.

17. In a fuel cell stack comprising a plurality of fuel cell units, each said fuel cell unit comprising an anode and a cathode, an electrolyte in contact on one side with the electrolyte facing face of said anode and in contact on the opposite side with the electrolyte facing face of said cathode, and a separator plate separating said cell units between an anode and cathode forming an anode chamber between the anode facing face of said separator plate and said anode and forming a cathode chamber between the opposite cathode facing face of said separator plate and the separator facing face of the cathode of an adjacent said fuel cell unit, said anode chamber in gas communication with a fuel gas supply and outlet and said cathode chamber in gas communication with an oxidant gas supply and outlet the improvement comprising:
   said electrolytes comprising an ion exchange membrane;
   said electrolytes, said anodes, said cathodes, and said separator plates extending to the peripheral edge region of said fuel cell stack;
   said separator plates having a flattened peripheral wet seal structure extending to contact less than about 1 inch width of at least one of an electrode and a current collector on each face of said separator plates completely around their periphery, forming a peripheral wet seal less than about 1 inch width under cell operating conditions;
   said electrolytes, said anodes, said cathodes, and said separator plates each having a plurality of aligned perforations, said perforations in said separator plates being surrounded by a flattened manifold wet seal structure extending to contact less than about 1 inch width of at least one of said electrode and said current collector on each face of said separator plate, forming a manifold wet seal less than about 1 inch width under cell operating conditions to form a plurality of gas manifolds extending through said cell stack; and
   conduits through said extended manifold wet seal structure providing fuel gas communication between one set of said manifolds and said anode chambers on one face of said separator plates and conduits through said extended manifold wet seal structure providing oxidant gas communication between a second set of said manifolds and said cathode chambers on the other face of said separator plates, thereby providing fully internal manifolding of fuel and oxidant gases to and from each said unit fuel cell in said fuel cell stack.

18. In a fuel cell stack according to claim 17, wherein cell stack end plates are configured the same as said separator plates on their inner faces and form half cells on each end of said fuel cell stack.

19. In a fuel cell stack according to claim 18, wherein said flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates.

20. In a fuel cell stack according to claim 19, wherein said extended manifold wet seal structure on one face of said separator plates comprises a pressed shaping of said separator plates to form said extended manifold wet seal on said one face of said separator plates and on the other face of said separator plates comprises a pressed shape forming said extended manifold wet seal fastened to said other face of said separator plates.

21. In a fuel cell stack according to claim 17, wherein said separator plates comprise an electronically conducting material and are about 0,005 to about 0,050 inches thick.

22. In a fuel cell stack according to claim 21, wherein said electronically conducting material is selected from the group consisting of stainless steel, graphite and a graphite/plastic composite.

23. In a fuel cell stack according to claim 17, wherein the width of said wet seals is about 0.25 to about 0.75 inches.

24. In a fuel cell stack according to claim 17, wherein said ion exchange membrane is a proton exchange membrane.

25. In a fuel cell stack according to claim 17, wherein said electrolytes comprise an organic polymer.

26. In a fuel cell stack according to claim 25, wherein said electrolytes comprise perfluorosulfonic acid.

27. In a fuel cell stack according to claim 24, wherein said electrolytes comprise an organic polymer.

28. In a fuel cell stack according to claim 27, wherein said electrolytes comprise perfluorosulfonic acid.

29. In a fuel cell stack according to claim 28, wherein said flattened peripheral wet seal structure on one face of said separator plates comprises a pressed shaping of said separator plates to form said extended peripheral wet seal on said one face of said separator plates and on the other face of said separator plates comprises a pressed shape forming said extended peripheral wet seal fastened to said other face of said separator plates and said extended manifold wet seal structure on one face of said separator plates comprises a pressed shaping of said separator plates to form said extended manifold wet seal on said one face of said separator plates and on the other face of said separator plates comprises a pressed shape forming said extended manifold wet seal fastened to said other face of said separator plates.

30. In a fuel cell stack according to claim 17, wherein said current collector extends to the peripheral edge region of said fuel cell stack.

31. A subassembly for a fuel cell unit comprising:
   an anode, a separator plate, and a cathode, said fuel cell unit having said anode, said cathode, and said separator plate extending to the edge region of a fuel cell stack, said separator plate having a flattened peripheral wet seal structure less than about 1 inch width extending from each face completely around their periphery, said anode, said cathode, and said separator plate each having a plurality of aligned perforations, said perforations in said separator plates being surrounded by a flattened manifold wet seal structure less than about 1 inch width extending from each face of said separator plate completely around said perforations;
   conduits through said extended manifold wet seal structure providing fuel gas communication between one set of said manifolds and said anode chamber on one face of said separator plates and conduits through said extended manifold wet seal structure providing oxidant gas communication between a second set of said manifolds and said cathode chamber on the other face of said separator plates, thereby providing fully internal manifolding of fuel and oxidant gases to and from each said unit fuel cell in said fuel cell stack;

said anode, said separator plate, and said cathode sealingly joined in each said seal areas; and said separator plate fabricated of a material selected from the group consisting of stainless steel, graphite and graphite/plastic composite.

32. A subassembly according to claim 31, wherein said sealingly joined comprises welding.

33. A subassembly according to claim 31, wherein said separator plate is about 0.005 to about 0.050 inch thick and said wet seals are about 0.25 to about 0.75 inches wide in the flattened portions of the wet seal structures.

34. A subassembly according to claim 31, wherein a current collector is between at least one of said anode and said cathode and said separator plate.

35. A subassembly according to claim 34, wherein said current collector extends to the edge region of said fuel cell stack.

* * * * *